United States Patent
Wang

(10) Patent No.: US 6,854,383 B2
(45) Date of Patent: Feb. 15, 2005

(54) APPLE/POTATO PEELER

(76) Inventor: Philip Wang, 7, Kao Cheng 9th Street, Tao Yuen (TW)

( * ) Notice: Subject to any disclaimer, the term of this patent is extended or adjusted under 35 U.S.C. 154(b) by 0 days.

(21) Appl. No.: 10/811,882

(22) Filed: Mar. 30, 2004

(65) Prior Publication Data

US 2004/0261634 A1 Dec. 30, 2004

(30) Foreign Application Priority Data

Jun. 25, 2003 (TW) ..................................... 92211571 U

(51) Int. Cl.[7] ............................................... A23N 3/00
(52) U.S. Cl. ............................. 99/542; 99/595; 99/598; 99/599
(58) Field of Search ........................... 99/515, 539–544, 99/584, 587, 588–599, 623; 426/481–483

(56) References Cited

U.S. PATENT DOCUMENTS

| | | | | | |
|---|---|---|---|---|---|
| 240,186 A | * | 4/1881 | Robb | ........................... | 99/592 |
| 242,660 A | * | 6/1881 | Law | ........................... | 99/598 |
| 255,856 A | * | 4/1882 | Heizmann | ...................... | 99/543 |
| 256,214 A | * | 4/1882 | Heizmann | ...................... | 99/541 |
| 256,800 A | * | 4/1882 | Holton | ........................ | 99/541 |
| 259,342 A | * | 6/1882 | Tripp | ........................... | 99/599 |
| 273,418 A | * | 3/1883 | Whittemore | .................. | 99/592 |
| 319,332 A | * | 6/1885 | Scott | ........................... | 99/545 |
| 360,527 A | * | 4/1887 | Hudson | ........................ | 99/541 |
| 508,137 A | * | 11/1893 | Huefner | ....................... | 99/543 |
| 5,950,528 A | * | 9/1999 | Wang | ........................... | 99/542 |
| 6,516,713 B1 | * | 2/2003 | Holmander | ................... | 99/541 |

* cited by examiner

*Primary Examiner*—Timothy F. Simone
(74) *Attorney, Agent, or Firm*—Bacon & Thomas PLLC

(57) ABSTRACT

An apple/potato peeler. The peeler includes a base, a main frame mounted to a slightly L-shaped structure on the base, a rotatable and axially movable screw horizontally supported on a screw support member on a vertical frame member disposed at the rear of the main frame, a 3-prong fork fixed to the front end of the screw, a guide piece pivotally mounted on the vertical frame member and being releasably engageable relative to a screw channel of the screw, a resiliently movable peeling arm fore-and aft swingeable pivoted to the front part of the horizontal frame member of the main frame, a U-shaped peeling blade fixed to the upper end of the movable peeling arm by a blade positioning device, and a coring/slicing blade fixed to the front end of the horizontal frame member for cutting flesh of a vegetable fruit held by the 3-prong fork if the screw into continuous spiral slices and for coring fruit.

5 Claims, 3 Drawing Sheets

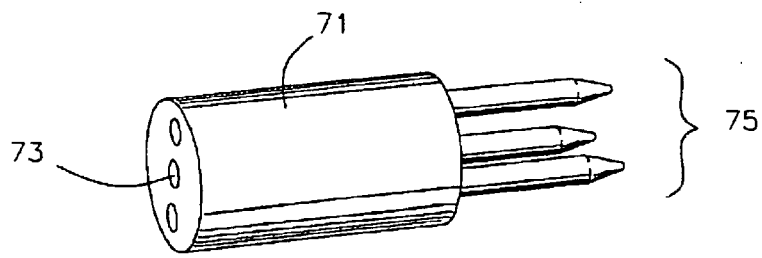
FIG. 4
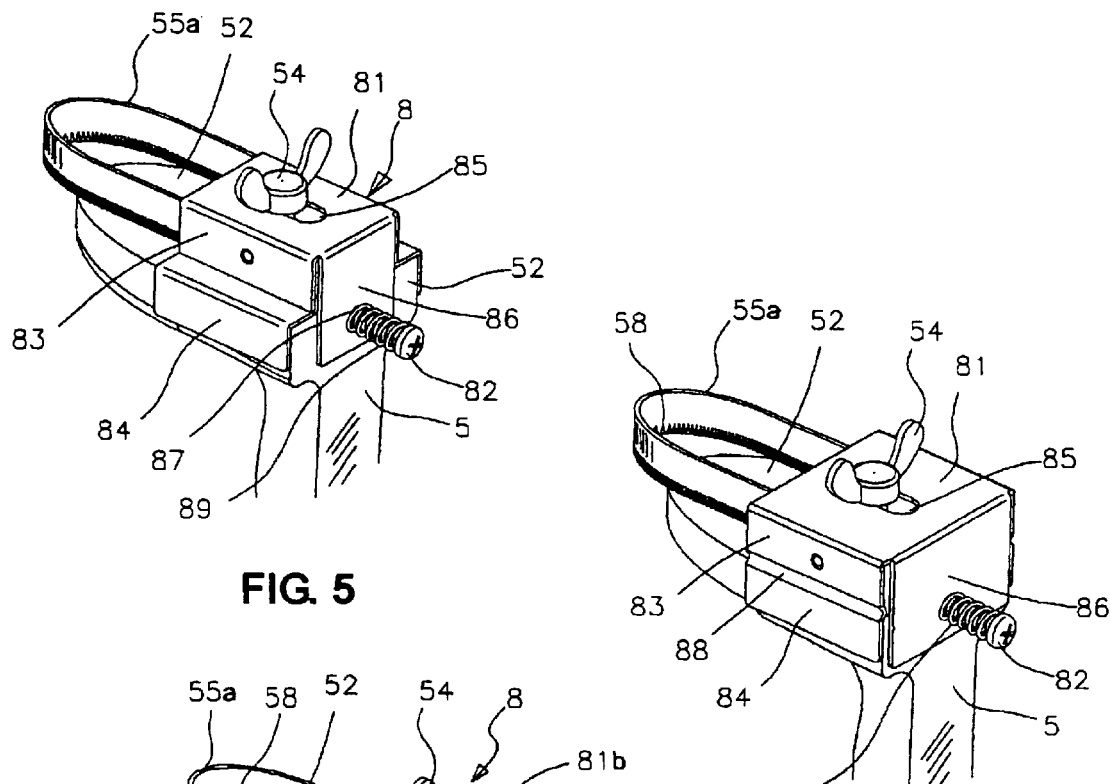
FIG. 5
FIG. 6
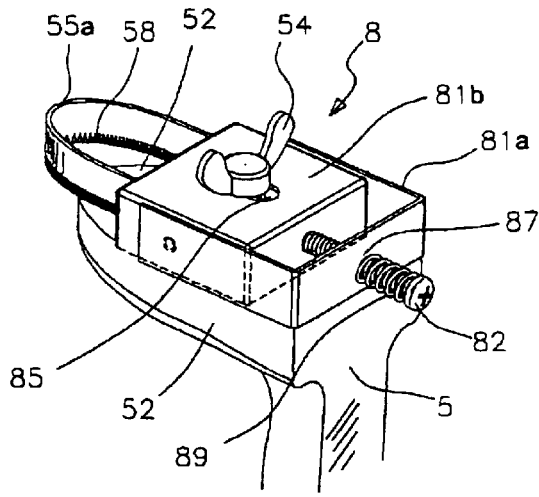
FIG. 7

APPLE/POTATO PEELER

1. FIELD OF THE INVENTION

The present invention relates to an apple/potato peeler and more specifically it relates to an improved centering device for an apple/potato peeler/slicer designed to peel, slice and core fruit and vegetables spherical in shape, such as apples and potatoes.

2. DESCRIPTION OF RELATED ART

The most common kitchen utensil for peeling fruit and vegetables spherical in shape, such as apples, pears and potatoes, is a peeler composed of a V-shaped handle and a trough-like blade mounted at the fork in the handle. The peeler has its merits, that is, it is cheap and easy to use. However, its drawback is that, peeling fruit and vegetables with such a peeler is a laborious job. As a tool for doing a limited amount of peeling work, the peeler is good enough. But the peeler will be inefficient and it will be likely to cut a user's fingers, if it is used in iced fruit shops or catering shops where a large amount of peeled fruit and vegetables are served.

Various types of apple/potato peelers were put on the market or developed to improve or facilitate the peeling process. As disclosed in Taiwan Patent No. 392485 published in the *Patent Gazette of Taiwan*, the clamp-based peeler is, basically, a clamp-like structure formed by axially connecting a peeling blade to a rotatable support on which the an apple or potato is positioned. A user manipulates the clamp-based peeler in such a way that the apple or potato, which has already been positioned on the support, is held by and between the peeling blade and the support. The user then manually turns the wheel beneath the rotatable support so that the apple or potato rotates along with the support for the sake of peeling. To operate such a peeler, a user has to grasp the handle with one hand while turning the wheel with the other hand. Although the user need not manipulate the blade, s/he finds her/his grip on the handle and the wheel exhausting and inaccurate.

The peeler disclosed in both Taiwan Patent No. 185105 and Taiwan Patent No. 265591 is easy to use. It comprises a wheel installed on a base, a pronged fork that can be rotated by means of a hand-turned handle, a peeling blade disposed on the wheel, and a set of driving gear. To start using the peeler, the user has to push the apple or potato on the pawl and turn the hand-turned handle manually. As a result, the apple or potato rotates while the wheel, driven by the driving gear, makes the peeling blade ride the curvy surface of the apple or potato for the sake of peeling. Such a peeler is more efficient and easier to use than the one mentioned above, because the base is positioned on a desk whereas the user operates the peeler using one hand only and need not take care of the peeling blade.

Taiwan Patent No. 451674 disclosed an automatic peeler that automatically peels the top and the bottom of an apple or potato by means of a motor and a programmable controller. It is quite different from the above-mentioned peelers because of its complicated structure and high cost. Furthermore, it is designed to peel off the skin on the concave portions of an apple or potato, thus other types of peelers are required to remove most of the peelings.

Manually or electrically, all the peelers mentioned above have the mere function of peeling. They are not designed to core and/or slice any peeled apples or potatoes.

Recently a hand-turned apple/potato peeler/corer/slicer is put on the market, and it is quite popular with overseas users. It is disclosed in FIGS. 1 through 3 of Taiwan Patent No. 418661. It involves turning a screw, by means of a hand-turned handle, to push an apple or potato pierced by and positioned at the tip of the screw. Its elastic, movable peeling blade and coring/slicing blade, both disposed in front of its base, peels, slices and cores the apple or potato while the apple or potato is rotating and advancing simultaneously. It is quite popular with users, because it is inexpensive and has a simple structure, and, more importantly, the user peels, cores and slices an apple or potato simultaneously by simply turning the handle. FIGS. 4 through 7 of Taiwan Patent No. 418661 disclose a technical plan which indicates that, the coring/slicing blade is replaced with a set of rotational blades, which resembles the blades of an electric fan, comprising radially disposed slicing blades and an annularly disposed coring blade, so as to slice and core an apple/potato simultaneously. Nevertheless, it is rather difficult to apply the aforesaid improved structure to practical peeling problems, for the following reasons. Given the great cutting force required, peeling and slicing an apple or potato simultaneously with six blades disposed radially in different directions and an annularly disposed blades is actually a demanding task. In such a situation, the blades are prone to deformation and thus they become almost useless. Therefore, although the patent itself is not new at all, so far the peeler on which the patent was taken out has not yet been put on the market.

Considering its peering/slicing function, simple structure and ease of use, the aforesaid conventional apple/potato peeler/slicer depicted in FIGS. 1 through 3 is a manual, multipurpose apple/potato peeler that is probably the most practical and failure-free of its kind for the time being. Nonetheless, the applicant purchased the peeler and conducted experiments on it, only to discover its two drawbacks, which represent room for improvement. The two disadvantages are as follows. Firstly, there are variations in the shape and size of apples and potatoes, thus it is difficult to center an apple or potato to be horizontally pierced and positioned by the 3-prong fork located at the tip of the screw. Therefore, rotation of the apple or potato is accompanied by its shaking and, in consequence, the peeling blade skips patches of skin or makes deep cuts. Another reason for the unsteady rotation of the apple or potato is that, during the slicing process a lateral cutting force is exerted on the apple or potato held by one end. Secondly, the cutting edge of the peeling blade is linear and thus it is likely to slide on the smooth skin of the apple or potato. In addition, given the unsatisfactory blade housing, during the slicing process any loosened screw may lead to the dislocation of the peeling blade. As a result, it can be difficult to slice the apple or potato with the peeling blade, or the peeling blade is likely to slide against the skin of the apple or potato or to get locked.

BRIEF SUMMARY OF THE INVENTION

In view of this, the applicant attempts to address the two aforesaid disadvantages of a conventional apple/potato peeler/corer/slicer with the following solution. While its operational features and favorable functions are reserved and its basic structure remains unchanged, improvement is made in the conventional apple/potato peeler/corer/slicer in three aspects, according to the present creation. It is equipped with a tail end centering device. The outline of the peeling blade is modified. It has a blade adjustment/positioning device.

The present invention is herein expounded on through the detailed description of the structure of the conventional apple/potato peeler/slicer below, by making reference to FIG. 1 first.

The apple/potato peeler/slicer has a disk-shaped base 1. A rubber suction base 12, which is fixed onto a bench or a desk by suction after the user has turned a base lever 11, is installed on the bottom surface of the base 1. A bow-shaped clamp-like structure like the ones designed to hold desk lamps or table tennis nets may be substituted for the base 1. The horizontal frame member 21 of a L-shaped main frame 2 is fixed on the base 1. One of the two ends of the horizontal frame member 21 is connected to a vertical frame member 22. On the top of the vertical frame member 22 is a U-shaped support member 23. The other end of the horizontal frame member 21 is connected to a short, plate-like, upright end support 24 disposed at a low level. A horizontally disposed screw 3, which can be rotated and propelled axially, is mounted on the U-shaped support member 23 by being held by two points. A rotational handle 31 is installed at the end of the part of the screw 3 outwardly sticking out of the support member 23. The opposite part of the screw 3 extends to a point above the upright end support 24. The end of the opposite part of the screw 3 is connected to a 3-prong fork 32 having three prongs. On the inner side of the vertical frame member 22 there is a pivot 41 to which a guide piece 4 is pivotally connected. The guide piece 4, which is intended to guide the screw 3, has a pawl 42 at its top. The pawl 42 is embedded in a screw channel 33 of the screw 3, at a point beside the support member 23, not only to guide the screw 3 in its axially-directed advance which is driven and accompanied by the rotation of the screw 3 itself, but also to prevent the screw 3 from sliding in an undesired manner. Whenever the screw 3 is rotating, the pawl 42 functions as a nut, because the pawl 42 makes the screw 3 move axially while the screw 3 is rotating. A tension spring 43 is installed between the top of the guide piece 4 and the middle of the vertical frame member 22 to pull the guide piece 4 counterclockwise, so that the pawl 42 is never detached but always embedded in the screw channel 33. Disposed at the lower end of the guide piece 4 is a handle 44 which extends downward. Once the handle 44 is pressed in the direction of the tension spring 43, the pawl 42 will be released from the screw channel 33. At that point, the user may hold the rotational handle 31 and push or pull the screw 3 axially.

A movable peeling arm 5 is disposed in front of the horizontal frame member 21, or to be more specific, between the upright end support 24 and a projecting lug 25 sticking out of the horizontal frame member 21. Extending upward, the 7-shaped movable peeling arm 5 is pivotally connected to a shaft 51 which is parallel to the horizontal frame member 21 and is disposed in between the upright end support 24 and the projecting lug 25. Given the shaft 51 and the arrangement thereof, the movable peeling arm 5 may be rotated freely. The movable peeling arm 5 has a flat top portion 52 at its top. Fixed to the flat top portion 52 is a U-shaped peeling blade 55 which is held by means of a n-shaped, metallic blade housing 53 and a thumb screw 54. The U-shaped peeling blade 55 points at a point slightly above the axis of the screw 3. A coil spring 56 is installed around the shaft 51 and beside the movable peeling arm 5, to provide the movable peeling arm 5 with the requisite momentum for turning toward the screw 3 (counterclockwise). As a result, the blade 55 of the movable peeling arm 5 always presses against an apple or potato held with the 3-prong fork 32. A lock lever 57 is installed beneath the movable peeling arm 5 to prevent the movable peeling arm 5 and the blade 55 from hindering the apple/potato loading/unloading process. The lock lever 57 enables the movable peeling arm 5 to turn clockwise to such an extent that, not only the apple/potato loading/unloading process will not be faced with any hindrance, but also the lock lever 57 itself will be automatically locked by a lock (not shown in the figure) located at the anterior part of the horizontal frame member 21 so that it will be leaning backward and remain open. To restore the movable peeling arm 5 to the normal state, the user has to pull the lock lever 57 to unlock it, and then the movable peeling arm 5 will return to its previous position under the tension of the coil spring 56.

With a thumb screw 63, a coring/slicing blade 6 is fixed on the upright end support 24 located at the end of the horizontal frame member 21, in such a way that the coring/slicing blade 6 is outside and above the upright end support 24. The coring/slicing blade 6 is composed of two portions, namely an annular blade 61 and a slicing blade 62. The annular blade 61, which is above the slicing blade 62, has its center aimed at the axis of the screw 3. The slicing blade 62, which is below the annular blade 61, extends from the center of the annular blade 61 with a downward slant.

To use an apple/potato peeler fabricated on the aforesaid structure, the user has to perform the following steps. Pull the movable peeling arm 5 aside. Press the handle 44 of the guide piece 4 to remove the pawl 42 from the screw channel 33. Pull the screw 3 to the utmost right. The user should center the apple or potato (not shown in the figure) to be peeled to such an extent that s/he aims the 3-prong fork 32 at the core of the apple or potato before s/he inserts the former into the latter. Restore the movable peeling arm 5 and the guide piece 4 to their normal state, so that the cutting edge of the U-shaped peeling blade 55 presses against the front of the apple or potato. With the thumb screw 54, adjust the position of the blade 55 and fasten it, if necessary. Turn the rotational handle 31 clockwise. Then, driven by the screw 3 behind, the apple or potato rotates and moves forward simultaneously. With the U-shaped peeling blade 55 behind and the coring/slicing blade 6 in front, the apple or potato is peeled while its flesh is cut into a long, spiral slice, leaving the cylinder-shaped core attached to the 3-prong fork 32. When peeling and slicing is done, pull the movable peeling arm 5 aside and remove the long, spiral slice of apple/potato flesh that has got in front of the coring/slicing blade 6. Pull the screw 3 to the utmost right. Remove the core from the 3-prong fork 32. To peel and slice the next apple or potato, just carry out the aforesaid steps again.

It does not require a user to possess any skill in order to operate a peeler/slicer having the foregoing structure. It takes around one minute to peel an apple with the peeler/slicer described above. The peeler/slicer is almost free of failure. Hence, it is quite popular with the household users in Europe and North America. However, as mentioned above, it does have two drawbacks, namely thick peelings or the tendency to skip patches of skin, as well as shaky turns and peeling in a wobbly fashion because of the great difficulty in centering an apple or potato to be peeled.

Intended to address the aforesaid shortcomings of a conventional peeler/slicer, the present invention improves the conventional peeler/slicer by adding some simple components to it while its original structure remains almost intact.

To put it specifically, the present invention involves adding a tail end centering device (component) 7, a peeling blade specially designed to deal with the aforesaid disadvantages and the blade positioning device 8 thereof, as shown in FIG. 2, to the apple/potato peeler/slicer having the aforesaid structure as shown in FIG. 1, so that not only does an apple or potato rotate smoothly and steadily because of the centrally applied grip of the peeler/slicer on both ends of the apple or potato, but, owing to the practical, adjustable blade positioning device 8, the apple or potato is efficiently peeled and the peeling process is no longer carried out with exertion.

FIG. 4 is a three-dimensional view of another preferred embodiment for the centering of the tail end center device put forth in the present invention.

FIG. 5 is a three-dimensional view of the peeling blade positioning device put forth in the present invention.

FIG. 6 is a three-dimensional view of an alternative to the peeling blade positioning device put forth in the present invention.

FIG. 7 is a three-dimensional view of another alternative to the peeling blade positioning device put forth in the present invention.

DETAILED DESCRIPTION OF THE PREFERRED EMBODIMENT

With reference to FIGS. 2 through 5, a preferred embodiment of the improved apple/potato peeler put forth in the present invention is thoroughly described as follows.

Figure 1:
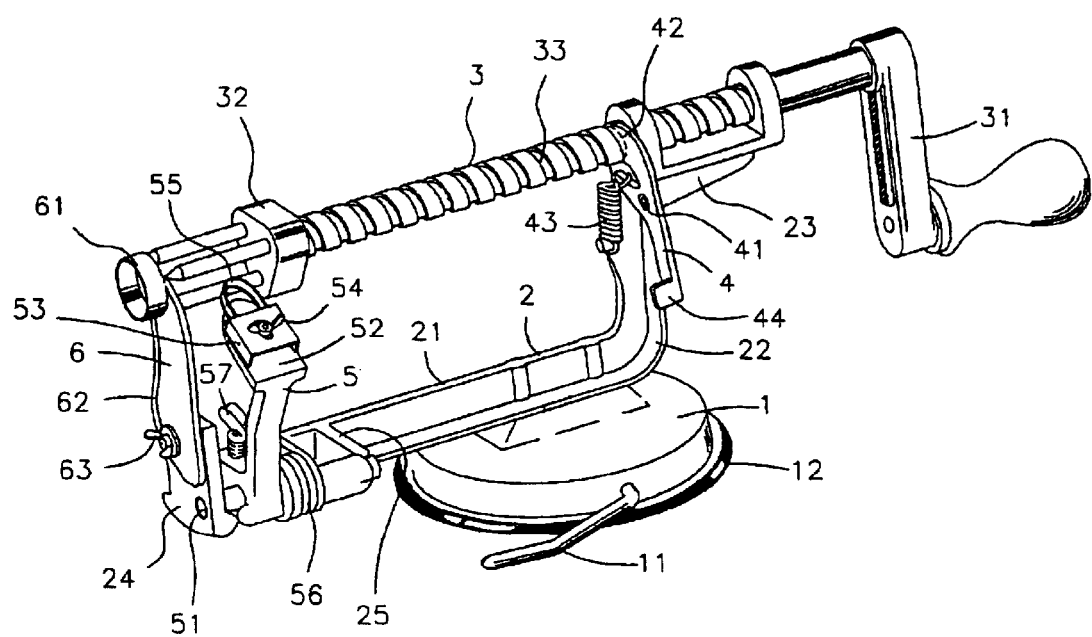
Figure 2:
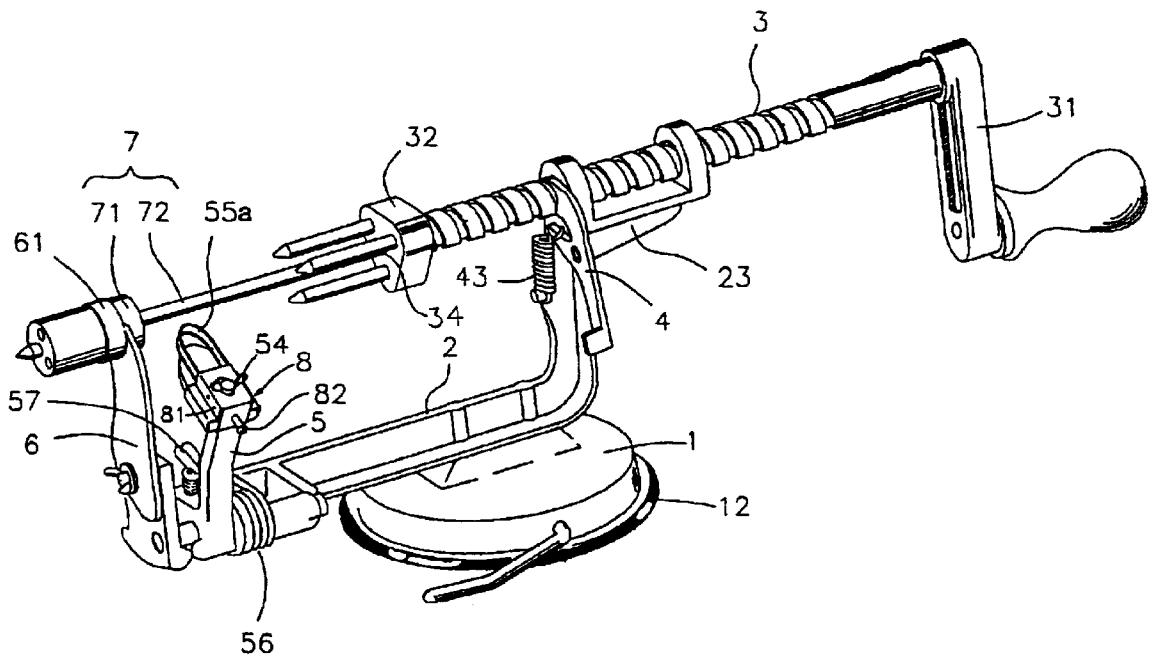
FIG. 2 is a three-dimensional view of the apple/potato peeler put forth in the present invention.

FIG. 2 is a three-dimensional view of the apple/potato peeler put forth in the present invention. As mentioned above, the peeler comprises a base 1 equipped with a rubber suction base 12, a main frame 2 fixed on the base I, a screw 3 which is rotatable, able to move axially and mounted horizontally on a U-shaped support member 23 of a main frame 2 while a 3-prong fork 32 is installed at its front end and the screw 3 having a hand-turned rotational handle 31 is installed at its rear end, a guide piece 4 which is pivotally connected to one side of the support member 23 and therefore may be embedded in or released from a screw channel 33 of the screw 3 when necessary, a movable peeling arm 5 which is pivotally connected to the anterior part of the horizontal frame member 21 of the main frame 2 and turns toward the screw 3 under the tension of a coil spring 56, a U-shaped peeling blade 55a installed on the flat top portion 52 located on the top of the movable peeling arm 5, a lock lever 57 which is disposed at the pivotal connection end of the movable peeling arm 5 and designed to make the movable peeling arm 5 immovable after the movable peeling arm 5 has been pulled away from the screw 3, and a coring/slicing blade 6 which is disposed in front of the main frame 2 and designed to cut apples or potatoes into spiral slices and core the apples or potatoes.

Figure 3:
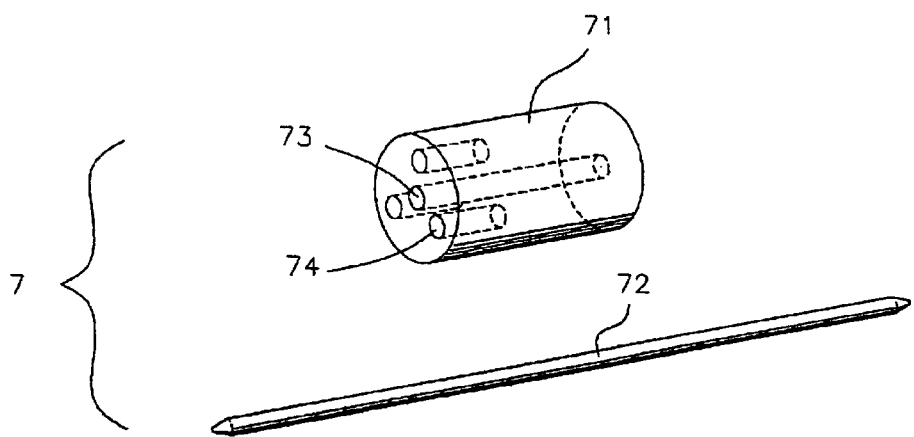
FIG. 3 is an illustration of the detailed structure of the tail end centering device put forth in the present invention.

A feature of the improvement in the present invention is as follows: a tail end centering device 7 is installed in between the end of the screw 3 where it is near the 3-prong fork 32 and an annular blade 61 above the coring/slicing blade 6; as shown in FIG. 3, the tail end centering device 7 comprises a centering cylinder 71 having a centrally-located center hole 73 and being freely imbedded in the annular blade 61 of the coring/slicing blade 6 as well as a center pin 72 with one end penetrating through the center hole 73 of the centering cylinder 71 and with another end inserting into a central indent 34 of the 3-prong fork 32. At least two blind holes 74, into which one end of the center pin 72 is inserted so as to form an exertion handle portion of the center pin 72 for pushing the tip of another end of the center pin 72 into the core of the apple or potato, are preferably symmetrically disposed at a point opposite the center hole 73, on the surface of an end of the centering cylinder 71. The tip of the center pin 72 may either be installed at one end only or be disposed at both ends.

In another embodiment, as shown in FIG. 4, a 3-prong fork 75 corresponding to the 3-prong fork 32 may be installed at the end of the centering cylinder 71 opposite the 3-prong fork 32 of the screw 3, to ensure that the apple or potato will be firmly held by the end.

Another feature of the improvement in the present invention is as follows: as shown in FIG. 5, the peeling-oriented U-shaped peeling blade 55a is lined with numerous tiny, saw-toothed teeth 58 or wavy, continuous teeth rather than being linear-edged as seen in a conventional peeling blade. Furthermore, the U-shaped peeling blade 55a is installed on an adjustable blade positioning device 8. As shown in FIG. 5, the adjustable blade positioning device 8 comprises a blade housing 81 with a U-shaped peeling blade's blade holder 83 installed above it and a n-shaped skirt portion 84 installed beneath it, where there is not any base in the T-shaped cross-section of the blade housing 81 and the skirt portion 84 slides to and fro so as to be embedded in the flat top portion 52 above the movable peeling arm 5, a thumb screw 54 fixing the blade housing 81 onto the flat top portion 52 by penetrating through a long hole 85 located at the top surface of the blade housing 81 and being screwed into the screw hole 87 of the flat top portion 52 (not shown), and an adjusting screw 82 which is screwed into a screw hole 87 of the rear vertical lug 86 of the blade housing 81 and has its front end pressed against the rear vertical wall of the flat top portion 52. A spring 89 is installed between a rear vertical lug 86 and the adjusting screw 82 in order to position the adjusting screw 82.

FIG. 6 is a diagram which shows another embodiment of the blade housing 81 with regard to the modification of its appearance. In the anterior part of the blade housing 81 is installed an opening whose cross-section is n-shaped. Above the blade housing 81 is installed the blade holder 83 as wide as the skirt portion 84 installed beneath the blade housing 81. An inwardly protruding transverse rib 88 is formed at the intersection of the skirt portion 84 and the blade holder 83 by stamping. The rear vertical lug 86 is disposed behind the blade housing 81 as it is in the aforesaid embodiment. The blade housing 81 having such a structure is positioned with a thumb screw 54 after the skirt portion 84 was embedded in the flat top portion 52 by sliding to and fro and the rib 88 was locked at the top of the two sides of the flat top portion 52.

FIG. 7 is a diagram which shows another embodiment of the blade positioning device 8 with regard to the modification of its appearance. Although the blade positioning device 8 illustrated with the two aforesaid embodiments has a blade housing, the blade positioning device 8 in the present embodiment has two blade housings, namely a base member 81a having a U-shaped cross-section and having the opening installed in its front and the screw hole 87 installed on its rear wall, and a blade housing 81b looking like the base member 81a but reversely embedded and sliding to and fro in the base member 81a. The two base members 81a and 81b are fixed onto the flat top portion 52 after the thumb screw 54 penetrated through a long hole 85 located at the top surface of the blade housing 81b and a hole on the bottom surface of the blade housing 81a and then was screwed into the screw hole (not shown) of the flat top portion 52. In addition, the anterior end of the adjusting screw 82 is screwed into the screw hole 87 of the base member 81a and is pressed against the rear wall of the blade housing 81b.

It is feasible to screw the aforesaid blade positioning device 8 into or out of the adjusting screw 82, by loosening the thumb screw 54, in order to push the blade housings 81 & 81a forward or pulling them backward, with a view to adjusting the thickness of the skins of apples/potatoes removed by the U-shaped peeling blade 55a.

To use an apple/potato peeler having the aforesaid structure, a user has to insert one end of the center pin 72 into any of the blind holes of the centering cylinder 71, then point the tip of the other end of the center pin 72 at the center of the core of an apple or potato, and then vertically insert it downward until a portion of the tip having a required length is exposed beneath the apple or potato. Afterward, the user has to remove the centering cylinder 71, insert one end of the center pin 72 into the centrally-located hole of the 3-prong fork 32, then push the apple or potato toward the 3-prong fork 32 in the direction indicated by the center pin 72 until all the three prongs of the 3-prong fork 32 are totally embedded in the core of the apple or potato, then insert the centering cylinder 71 into another end of the annular blade 61 sticking out of the center pin 72 and embed the centering cylinder 71 in the annular blade 61 until the inner end of the centering cylinder 71 is pressed against the bottom end of the apple or potato. Given the aforesaid procedure, an apple or potato is centered and held by its two ends and thus it is rotated smoothly and steadily, by means of the center pin 72, the 3-prong fork 32 and the centering cylinder 71. After centering and properly holding the apple or potato, the user has to press the U-shaped peeling blade 55a against the skin of the apple or potato, optimize the positioning of the U-shaped peeling blade 55a by adjusting the adjusting screw 82, turn the rotational handle 31 to rotate and push the screw 3 forward, and perform peeling, slicing and coring by means of the one-step rotation process. As mentioned above, the cutting edge of the U-shaped peeling blade 55a is toothed, the apple or potato is centered with the center pin 72 and held by its two ends, thus the apple or potato rotates more smoothly and steadily. As a result, with such a peeler, the user may make shallow cuts, economically and tidily.

Furthermore, the present invention involves the addition of only one center pin and one centering cylinder, introducing a saw-toothed cutting edge to the blade, and designing the blade positioning device of the peeler in such a way to prevent deviation but enable minute adjustment. In other words, the present invention does not change the original structure and components of the peeler at all. Hence, it is not necessary to modify the original die designed for the production of the peelers; and, the manufacturing costs of the new components are low. Therefore, with the present invention, the peeler is improved to enable practical usage, at minimal cost.

What is claimed is:

1. An improved apple/potato peeler, comprising:
   a base;
   a main frame mounted to a slightly L-shaped structure on said base;
   a rotatable and axially movable screw horizontally supported on a screw support member on a vertical frame member disposed at the rear of said main frame;
   a 3-prong fork fixed to the end of said screw;
   a guide piece pivotally front mounted on said vertical frame member and being releasably engageable relative to a screw channel of said screw;
   a resiliently movable peeling arm fore-and-aft swingeably pivoted to the front part of the horizontal frame member of said main frame;
   a U-shaped peeling blade fixed to the upper end of said movable peeling arm by means of a blade positioning device;
   a coring/slicing blade fixed to the front end of said horizontal frame member for cutting flesh of a vegetable or fruit held by the 3-prong fork of said screw into continuous spiral slices and coring said vegetable or fruit;
   an annular blade for coring at the upper end of said coring/slicing blade is inlaid within a centering cylinder having at the center thereof located with a small-caliber center through hole aiming exactly at the center of the 3-prong fork and through the center through hole of said centering cylinder is passed a center pin with one end inserting into a central indent of said 3-prong fork and the other end penetrating through said center through hole of said centering cylinder; and
   a tail end centering device comprising said centering cylinder and said center pin and coupled with said 3-prong fork of said screw, and said peeler is capable of holding an apple/potato by the head and tail ends thereof in a supporting manner and maintain accurate centering and steady rotation thereof.

2. The apple/potato peeler of claim 1, wherein the downward edge of a U-shaped peeling blade is formed into an edge with finely arranged continuous dentate or wavy shape.

3. The apple/potato peeler of claim 1, wherein a blade positioning device fixed to said U-shaped peeling blade at the top of said movable peeling arm comprises: a blade housing with the upper part thereof having a blade holder and the lower part thereof having a skirt portion fore-and-aft slidably engaged to the flat top portion at the upper end of said movable peeling arm and with a section being of a slight T-shape, a thumb screw for penetrating through an elongate hole at the top surface of said blade housing to fix said blade housing onto said flat top portion, and an adjusting screw screwed into a screw hole on the rear vertical lug of said blade housing and having front end thereof pressing against the rear wall of said flat top portion.

4. The apple/potato peeler of claim 1, wherein said blade positioning device of said U-shaped peeling blade comprises: said blade housing with the upper part thereof having a blade holder and the lower part thereof having a skirt portion fore-and-aft slidably engaged to the flat top portion at the upper end of said movable peeling arm and with a section being of a T-shape, a thumb screw for penetrating through an elongate hole at the top surface of said blade housing, to fix said blade housing onto said flat top portion, and an adjusting screw screwed into a screw hole on the rear vertical lug of said blade housing and having front end thereof pressing against the rear wall of said flat top portion; wherein an inwardly protruding transverse rib is formed on each of the two side walls at the intersection of said skirt portion and said blade holder having the same width, whereas said blade housing is engaged in said flat top portion by means of said skirt portion and locked on said flat top portion of movable peeling arm by means of said ribs.

5. The apple/potato peeler of claim 1, wherein said blade positioning device of said U-shaped peeling blade comprises a trough-shaped base member having an opening in the front thereof and a screw hole on the rear wall thereof a blade housing fore-and aft slidably engaged in said base member and having an elongate hole on the top surface thereof, a thumb screw for penetrating through said elongate hole of said blade housing and said bottom hole of said base member to be screwed into said screw hole of said flat top portion to fix said blade housing and said base member onto said flat top portion, and an adjusting screw screwed into a screw hole provided on the rear wall of said base member and the front end thereof pressing against the rear wall of said blade housing.

* * * * *